United States Patent [19]

Takahashi et al.

[11] Patent Number: 5,011,531
[45] Date of Patent: Apr. 30, 1991

[54] METHOD AND APPARATUS FOR DEGASSING MOLTEN METAL UTILIZING RH METHOD

[75] Inventors: Kiyoshi Takahashi; Nobuyoshi Takashiba; Shinji Kojima; Haruji Okuda; Shigeru Ohmiya; Ryuichi Ikeda, all of Okayama, Japan

[73] Assignee: Kawasaki Steel Corporation, Hyogo, Japan

[21] Appl. No.: 456,236

[22] Filed: Dec. 27, 1989

Related U.S. Application Data

[63] Continuation of Ser. No. 212,608, Jun. 28, 1988, abandoned.

[30] Foreign Application Priority Data

Jun. 29, 1987 [JP] Japan .................. 62-159699

[51] Int. Cl.⁵ .............................................. C21C 7/00
[52] U.S. Cl. ........................................ 75/511; 266/209
[58] Field of Search ............... 75/49, 59, 511, 510; 266/208, 209, 210, 81

[56] References Cited

U.S. PATENT DOCUMENTS

| | | | |
|---|---|---|---|
| 3,042,510 | 7/1962 | Armbruster et al. | 266/210 |
| 3,310,850 | 3/1967 | Armbruster | 75/49 |
| 3,320,053 | 5/1967 | Lehman | 75/59 |
| 3,367,396 | 2/1968 | Sickbert et al. | 266/210 |
| 3,607,228 | 9/1971 | Todd | 75/49 |

FOREIGN PATENT DOCUMENTS

| | | |
|---|---|---|
| 516103 | 1/1976 | Japan . |
| 517202 | 6/1976 | Japan . |
| 920874 | 11/1959 | United Kingdom . |
| 954214 | 8/1960 | United Kingdom . |

OTHER PUBLICATIONS

Patent Abstracts of Japan, vol. 9, No. 74(C-273) & JP-A-59 208011 26-11-84.
Patent Abstracts of Japan, vol. 7, No. 83(C-160 & JP-A-58 11721 22-01-83.
Patent Abstracts of Japan, vol. 10, No. 23 (C-325) & JP-A-60 177122 11-9-85.

Primary Examiner—S. Kastler
Attorney, Agent, or Firm—Austin R. Miller

[57] ABSTRACT

A method and apparatus for vacuum degassing blows gas into molten metal so as to form a substantially uniformly distributed bubble over the path area defined by an induction pipe. In order to achieve this, discharge nozzles are separated into at least two groups. The pressures of the gases discharged through the discharge nozzles in different groups are controlled independently of the other so that gas blown through a first group of nozzles forms bubbles at around the central portion of the induction pipe and the pressure of the gas blown through the other group of nozzles is adjusted for forming the bubbles in the vicinity of the periphery of the induction pipe.

8 Claims, 3 Drawing Sheets

METHOD AND APPARATUS FOR DEGASSING MOLTEN METAL UTILIZING RH METHOD

This application is a continuation of application Ser. No. 212,608, filed June 28, 1988.

BACKGROUND OF THE INVENTION

1. Field of the Invention

The present invention relates generally to a technique for degassing of molten metal for producing high purity metal products, such as extra low carbon steel. More specifically, the invention relates to a method and apparatus for degassing molten metal utilizing the RH method.

2. Description of the Background Art

Recently, requirements for high quality metal have been substantially increased. Some kinds of metals require vacuum degassing treatment for removing impurities for better quality. To answer such requirement, it is desired to develop a method and apparatus which may allow high efficiency in degassing treatment and lower tapping temperature in a converter for lower production cost.

As is well known, a molten metal in a ladle is introduced into a vacuum chamber for subjecting to vacuum atmosphere to extract and remove carbon and other impurities. For example, Japanese Patent First (unexamined) Publication (Tokkai) Showa 51-71202, published on June 19, 1976, discloses a method of vacuum degassing for molten metal utilizing the apparatus set forth above. The disclosed apparatus has an induction pipe immersed into the molten metal in the ladle for introducing the molten metal into the vacuum chamber from the ladle, and a return pipe to return the molten metal from the vacuum chamber to the ladle. The induction pipe and the return pipe are oriented in spaced apart relationship to each other so that the molten metal in the vacuum chamber flows from the discharge outlet of the induction pipe the returning inlet of the return pipe in the vacuum chamber. By this construction, the molten metal can be maintained for a longer period in the vacuum chamber to remove a greater amount of impurity. Such method is known as the "Ruhrstahl Hausen (RH) method". In such case, the efficiency of removal of impurities is variable depending upon the circulation rate of the molten metal in the vacuum chamber and the surface area of the molten metal in direct contact with the vacuum atmosphere in the vacuum chamber. In the RH method, an inert gas, such as Ar gas, is blown into the induction pipe for circulating the molten metal in the ladle into the degassing chamber. The resulting Ar bubble serves not only for circulating flow of molten metal through the degassing or vacuum chamber but also for providing greater surface area in the vacuum chamber by bubbling at the surface. Therefore, such gas blow technology is well introduced in the RH method for the sake of higher impurity removal efficiency.

As will be naturally appreciated, for increasing the circulation rate of the molten metal, it is important to increase the gas flow rate through the induction pipe. To increase gas circulation rate, it is required to provide a wider path area of the induction pipe communicating between the ladle and the vacuum chamber. However, the path area of the induction pipe is limited by the internal diameter of the vacuum chamber. Therefore, in order to expand the path area, it becomes necessary to expand the diameter of the vacuum chamber, which causes necessity of re-construction of associated facilities.

On the other hand, in the usual degassing process, the gas pressure to be blown into the molten metal is limited to lower than or equal to 9.9 kg/cm$^2$. Such relatively low pressure gas is blown into the molten metal and introduced into the vacuum chamber via an induction pipe of 3 to 5 mm diameter. In the practical construction, 8 to 20 gas discharge pipes or nozzles are circumferentially arranged around the ladle for blowing the gas. However, because of low pressure, a bubble formed gas blow is formed around the periphery of the induction pipe leaving the central position of the induction pipe not bubbled. Such flow of the bubble in the induction pipe will be hereafter referred to as "peripheral bubble flow". The peripheral bubble flow in the conventional art is not at all effective to improve impurity removal efficiency as required or expected.

In order to improve such drawbacks in the conventional art, Japanese Patent First Publication (Tokkai) Showa 51-6103, published on Jan. 19, 1976, discloses an apparatus which blows the inert gas to an orientation in the vicinity of the center axis of the induction pipe. This is successfully introduced for capability of formation of the bubble at the central portion of the induction pipe thus improving impurity removal efficiency. Such flow of the bubble will be hereafter referred to as "center bubble flow". However, this still has some drawbacks. For instance, since the gas nozzle has to be introduced into the molten metal in the ladle it is subject to substantial heat to shorten the life of the nozzle. Furthermore, since the nozzle is heated at a substantial temperature, replacement of the nozzle for repair becomes difficult and an unacceptably long period. Furthermore, such center bubble type flow tends to cause temperature fluctuation on the peripheries of the vacuum chamber and the induction pipe to cause spalling on the refractory.

SUMMARY OF THE INVENTION

Therefore, it is an object of the present invention to provide a method and apparatus which may solve the problems encountered in the conventional art.

Another object of the invention is to provide a method and apparatus for removing impurities including carbon for producing an extra low carbon metal, which can reasonably improve efficiency in degassing treatment.

In order to achieve the aforementioned and other objects and advantages, a method and apparatus for vacuum degassing, according to the invention, performs blowing of gas into the molten metal so as to form a substantially uniform distribution of bubbles over the path area defined by the induction pipe. In order to achieve this, the discharge nozzles are separated into at least two groups. The gas pressure to be discharged through the discharge nozzles in different groups is controlled independently of each other so that gas blown through a first group of nozzles forms bubbles at around the central portion of the induction pipe. The pressure of the gas blown through the other group of nozzles is adjusted for forming the bubbles in the vicinity of the periphery of the induction pipe.

According to one aspect of the invention, a method for degassing molten metal comprising the steps of:
establishing a path for circulating molten metal through a degassing chamber which is maintained under vacuum;

connecting a high pressure gas discharge nozzle to the path upstream of the degassing chamber for discharging high pressure gas into the molten metal; connecting a low pressure gas discharge nozzle to the path upstream of the degassing chamber for discharging low pressure gas into the molten metal; and controlling the pressures of the high pressure gas and low pressure gas independently of each other.

The high pressure gas and the low pressure gas may be discharged transversely to the flow direction of the molten metal at the position where the high pressure gas discharge nozzle and the low pressure gas discharge nozzle are provided.

Preferably, the method further comprises the step of placing the degassing chamber above a container containing the molten metal and connecting the degassing chamber with the container by first and second vertical segments of the path, the first vertical segment being arranged upstream of the degassing chamber for introducing molten metal from the container to the degassing chamber and the second segment being arranged downstream of the degassing chamber for recirculating the molten metal from the degassing chamber to the container, and the steps of the connecting the high and low pressure gas discharge nozzles are performed for discharging the high and low pressure gases in substantially horizontal directions.

In the preferred embodiment, the high and low pressure gases to be discharged into the molten metal are inert gas. Further preferably, the inert gas contains a given percentage of oxygen. On the other hand, the pressure of the high pressure gas is variable depending upon the distance to reach the pressurized gas. Since the high pressure gas is intended to be blown into the central portion of the first vertical segment, the pressure of the high pressure gas may be variable depending upon the diameter of the first vertical segment. In generalized consideration, the gas pressure of the high pressure gas can be illustrated by:

$$P = K \times d^i \times D^j$$

where

P is the gas pressure (kg/cm$^2$);
K is in the range of 0.15 to 0.80
i is 3.8/d+1
j is $\frac{2}{3}$
d is the discharge nozzle diameter (mm); and
D is the diameter of the first vertical segment.

In the preferred embodiment, the pressure of the high pressure gas may be in a range of about 30 kg/cm$^2$ to about 50 kg/cm$^2$ and the pressure of the low pressure gas may be in a range of the static pressure of the molten metal to 9.9 kg/cm$^2$.

According to another aspect of the invention, the apparatus for degassing molten metal comprises a container containing a molten metal, a degassing chamber oriented above the container and connected to a vacuum source for maintaining vacuum, a first path for circulating the molten metal from the container to the degassing chamber, a second path for circulating the molten metal from the degassing chamber to the container, a high pressure gas discharging means for discharging high pressure gas into the molten metal in the first path, and a low pressure gas discharging means for discharging low pressure gas into the molten metal in the first path, wherein pressures of the high pressure gas and the low pressure gas are controlled independent of each other for establishing uniform distribution of gas through over the first path.

The high pressure gas discharging means may define a smaller gas flow area than that of the low pressure gas discharging means. This may achieve uniformity of gas flow rate in the gas discharged from the high and low pressure gas discharging means. In the preferred construction, the high pressure gas discharging means comprises a plurality of first nozzles arranged in circumferential alignment and the low pressure gas discharging means comprises a plurality of second nozzles in circumferential alignment. The first and second nozzles are vertically arranged at mutually different elevations. More specifically, the first nozzles are circumferentially arranged in alignment and oriented at a lower elevation than that the second nozzles which are also circumferentially arranged in alignment. The first and second nozzles may have axes extending substantially transverse to the axis of the first path.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
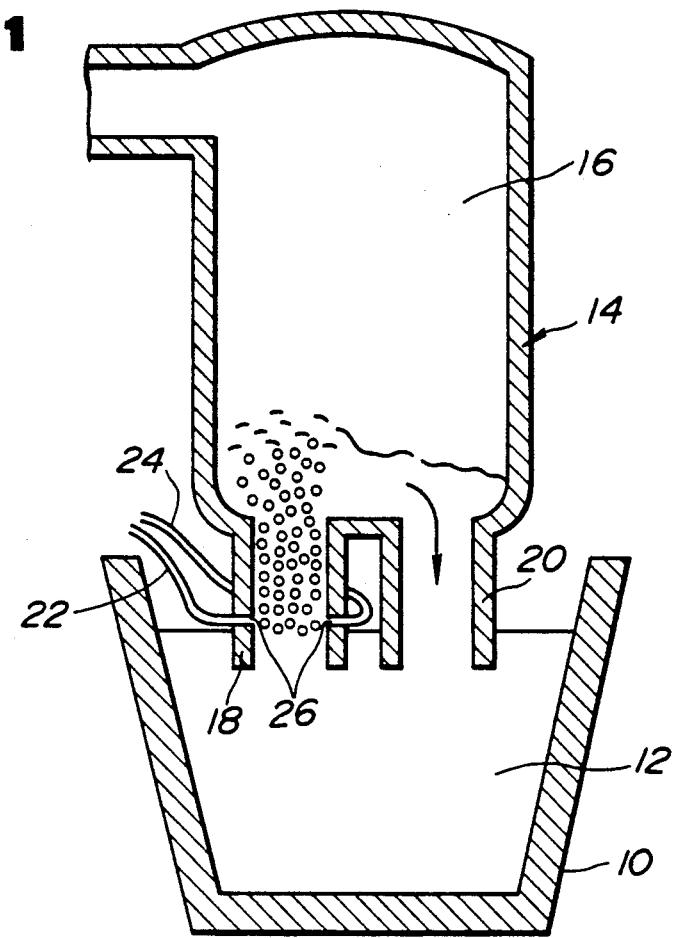
FIG. 1 is a sectional view of the preferred embodiment of RH degassing apparatus according to the present invention.
Figure 2:
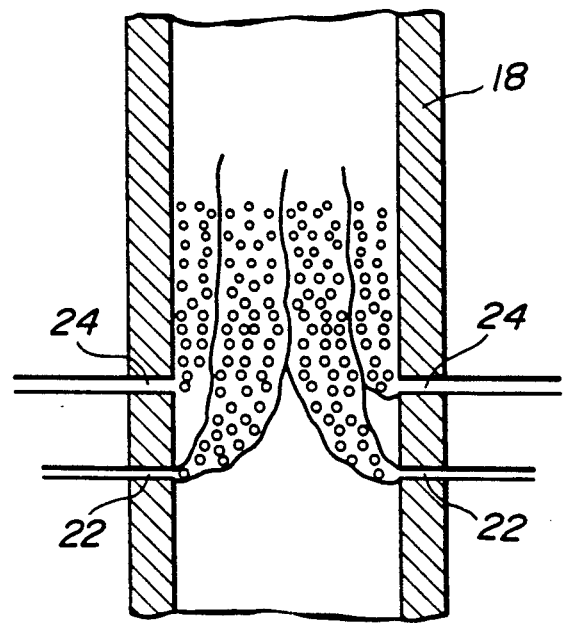
FIG. 2 is an enlarged section of the major part of the preferred embodiment of RH degassing apparatus of FIG. 1.

Referring now to the drawings, particularly to FIGS. 1 and 2, the preferred embodiment of an RH degassing apparatus, according to the invention, has a molten metal container 10, such as a molten metal ladle, containing molten metal 12, and a degassing apparatus 14 which defines a degassing chamber 16 therein. The degassing chamber 16 is connected to a vacuum source (not shown) to be maintained in vacuum. As seen from FIG. 1, the degassing apparatus 14 is oriented above the container 10. In the shown construction, the degassing apparatus 14 has an induction or suction pipe section 18 and a return pipe section 20. These induction pipe section 18 and return pipe section 20 are integrally formed with the body of the degassing apparatus 14 and communicate with the degassing chamber 16 at upper ends thereof. The lower ends of the induction pipe section 18 and the return pipe section 20 are immersed into the molten metal 12 in the container 10. Therefore, the molten metal container 10 and the degassing chamber 14 are connected to each other via the induction pipe section 18 and the return pipe section 20. The molten metal 12 in the container 10 rises up to the degassing chamber 16 via the induction pipe section 18 and recirculates into the container 10 via the return pipe section 20.

A plurality of high pressure gas discharge nozzles 22 and low pressure gas discharge nozzles 24 are inserted into an induction path 26 defined in the induction pipe section 18. The axes of the nozzles 22 and 24 at least at the gas discharge outlet are directed substantially transverse to the axis of the induction pipe section 18. The high pressure gas discharge nozzle 22 is connected to a high pressure gas source (not shown). Similarly, the lower pressure gas discharge nozzle 24 is connected to a low pressure gas source (not shown). As shown, the high and lower pressure nozzles 22 and 24 are oriented at vertically different height positions, as particularly shown in FIG. 2. In the shown embodiment, the high pressure gas discharge nozzles 22 are vertically oriented at a lower elevation than the lower pressure gas discharge nozzle 24 and are circumferentially arranged at given angular intervals. Similarly, the lower pressure gas discharge nozzles 24 are circumferentially arranged at given intervals a higher elevation than the high pressure gas discharge nozzles. As can be seen from FIG. 2, the internal diameter of the high pressure gas discharge nozzle 22 is smaller than that of the low pressure gas discharge nozzle 24. Ratios of the diameters of the higher pressure gas discharge nozzles 22 and the low pressure gas nozzles 24 are determined in view of ratio of the gas pressures to be discharged therethrough so that the gas flow rates at the central portion and the circumferential portion in the induction pipe section 18 become even for uniformity of bubbles generated at the respective portions.

Though the shown embodiment employs an arrangement of the high and low pressure gas discharge nozzles 22 and 24 in vertically offsetting arrangement, it may be possible to arrange both of the high pressure gas discharge nozzles and lower pressure gas discharge nozzles at the same vertical orientation. Furthermore, though the shown embodiment arranges the high pressure gas discharge nozzles at a lower elevation in circumferential alignment and the lower pressure gas discharge nozzles at a higher elevation in circumferential alignment, it may also be possible to arrange both of high and low gas pressure discharge nozzles at different elevations in a circumferentially alternative arrangement. However, the shown arrangement of nozzles is preferred in view of avoidance of interference of the high and low pressure gases discharged through the high and low pressure gas discharge nozzles, which may occur otherwise.

Concerning the gas flow rate q in the induction pipe section 18, it is proportional to the discharge nozzle diameter d and the discharge gas pressure P. Therefore, the gas flow rate can be calculated by:

$$q = b \times d^i \times p$$

On the other hand, the distance Lh for travel of the gas is proportional to the velocity of the gas. The distance Lh can be illustrated by:

$$Lh = a \times (q/d)^j$$
$$= a (b \times d^i \times P/d)^j$$

Since the high pressure gas has to reach the central portion of the induction pipe section 18, the distance Lh can be illustrated by:

$$Lh = D/2$$

On the other hand, the pressure of the high pressure gas is variable depending upon the distance the pressurized gas is intended to travel. Since the high pressure gas is intended to be blown into the central portion of the first vertical segment, the pressure of the high pressure gas may be variable depending upon the diameter of the first vertical segment. In generalized consideration, the gas pressure of the high pressure gas can be illustrated by:

$$P = K \times d^{-(i-2)} \times D^{1/j}$$

where
D is the diameter of the induction pipe section 18; and
K is 0.15 to 0.8 which is a coefficient obtained through experiments.

In order to determine the optimum values of K, i and j, experiments have been performed. As a result, it has been found that optimum performance can be obtained under the following conditions:
K: 0.15 to 0.8
i: 3.8/d + 2
j: ⅔

Figure 3A:
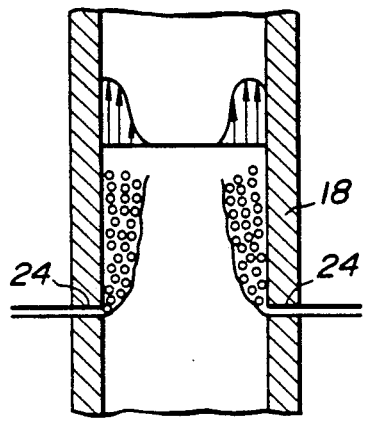
FIGS. 3a and 3b are illustrations showing water utilizing models showing the position to form bubble relatively to pressure of gas to be discharged.
Figure 4A:
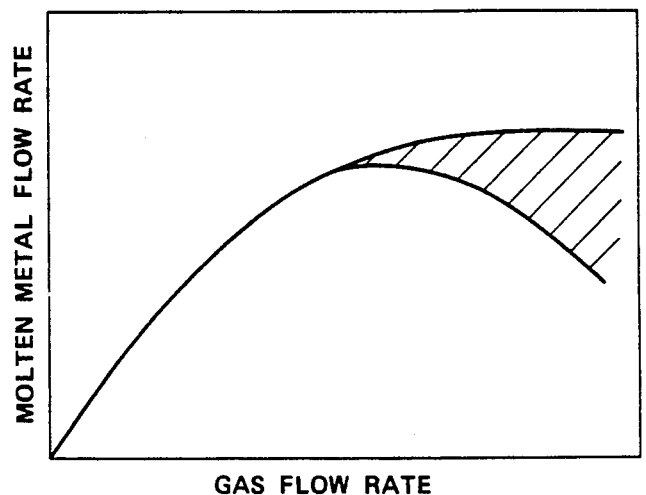
FIGS. 4(a) and 4(b) are graphs showing variation of molten metal circulation rate in a vacuum chamber in relation to blown gas flow rate.
Figure 3B:
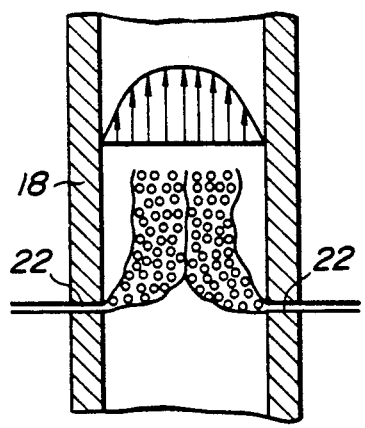
Figure 4B:
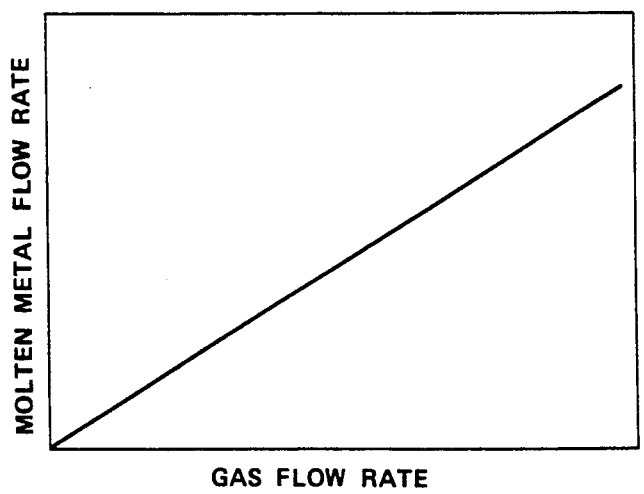

In order to confirm the effect of the gas flow for increasing the molten metal flow rate into the degassing chamber 16, models shown in FIGS. 3a and 3b were prepared. The model of FIG. 3a is designed for discharging low pressure gas and the model of FIG. 3b is designed for discharging high pressure gas. Experiments were performed utilizing water as liquid. As seen from FIGS. 3a and 3b, depending upon the gas pressure to be discharged, the radial distance traveled to form the bubbles varies.

In FIGS. 3a and 3b, the arrows show the water flow velocity. Based on the results obtained from the experiments set forth above, the gas pressure to be discharged through the high pressure gas discharge nozzles 22 is set in a range of 30 to 50 kg/cm² and the gas pressure to be discharged through the low pressure gas discharge nozzles 24 is set in a range of 0 to 9.9 kg/cm² for an induction pipe section 18 having an internal diameter of 40 to 50 cm.

In practical degassing operation, the gas flow rate through the high pressure gas discharge nozzles 22 is set at a value of about 1000 Nl/min and the gas flow rate through the low pressure gas discharge nozzles 24 is set in a range of 1500 to 2000 Nl/min.

With the constructions set forth above, the molten metal flow rate in the degassing chamber was increased to about 90% in comparison with that of the conventional apparatus and the period required for degassing could be shortened by about 50%.

Here, in the aforementioned degassing process, Ar gas has been conventionally used as the inert gas to be blown into the induction path. Discharging of the gas through the gas discharge nozzles 22 and 24 tends to cool the molten metal around the discharge outlet thereof. As a result of cooling the molten metal, a mushroom 30 (FIG. 5) tends to grow around the discharge outlet of the nozzle. When the mushroom 30 grows around the discharge outlet of the nozzle, pressurized gas flows through small diameter openings 32. Since the internal diameters of the openings 32 are substantially small and serve as resistances against gas flow, the discharge pressure of the gas can be lowered to be insufficient and can reach the central portion of the induction path even when high pressure gas is supplied.

Figure 5:
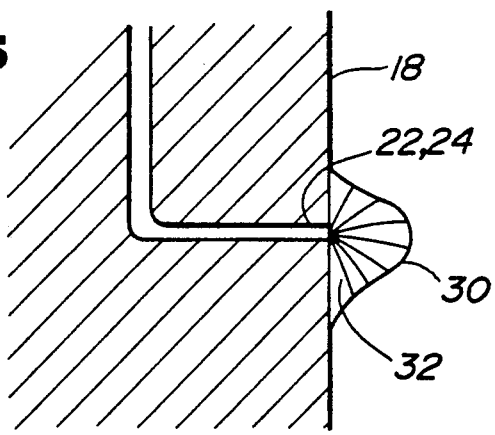
FIG. 5 is an explanatory illustration of a portion around the discharge outlet of a discharge nozzle in the apparatus of FIG. 1.

In order to prevent the mushroom from growing around the discharge outlet of the gas discharge nozzles, the preferred embodiment of the degassing apparatus employs an inert gas, such as Ar gas containing a given percentage, e.g. in a range of 0.01 to 20.0% preferably in a range of 1.0 to 5.0%, of $O_2$. FIG. 5 shows the diameter of a mushroom formed during the gas blow. As seen from FIG. 5, when Ar gas not containing $O_2$ is used, the diameter of the mushroom increases according to the increase of gas flow rate. On the other hand, when the inert gas contains $O_2$, the diameter of the mushroom can be held substantially smaller.

Figure 6:
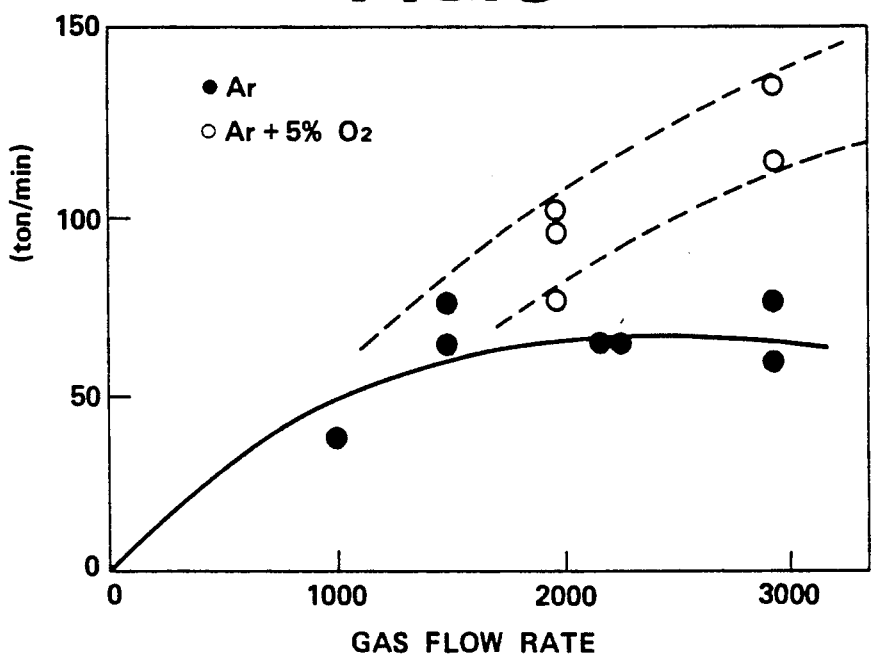
FIG. 6 is a graph showing variation of size of mushroom formed around the discharge outlet of the discharge nozzle.
Figure 7:
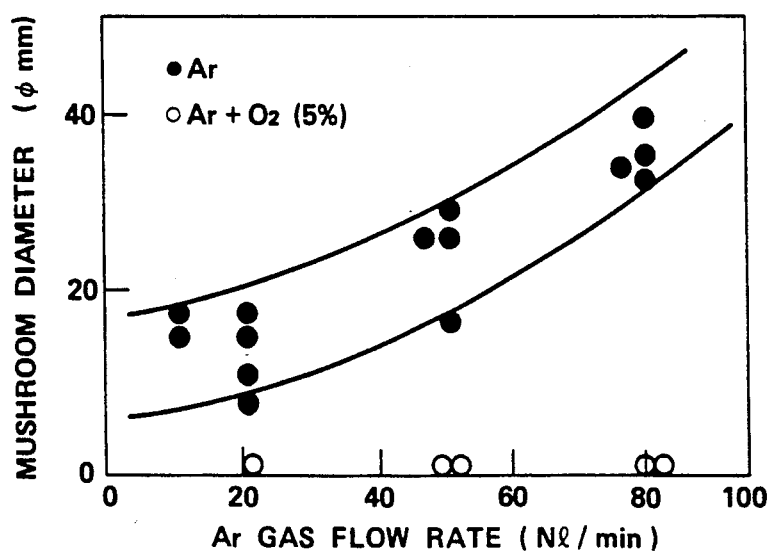
FIG. 7 is a graph showing variation of molten metal flow rate relative to gas flow rate.

For confirming the performance of the degassing apparatus set forth above, a degassing operation was performed for molten metal in a ladle having volume of 250 tons by varying the gas flow rate. Experiments were performed with respect to Ar gas containing no $O_2$ gas and Ar gas with 5% of $O_2$ to check the molten metal flow rate in the induction pipe section having an internal diameter of 550 mm. The molten metal flow rate to the degassing chamber 16 relatively to the gas flow rate substantially saturated was in a range of gas flow rate greater than 1500 Nl/min when pure Ar gas was used. On the other hand, in case of the $O_2$ containing Ar gas, the molten metal flow rate increased according to increase of the gas flow rate even at the gas flow rates greater than 1500 Nl/min, as shown in FIG. 6.

This confirms that $O_2$ combined with the inert gas is effective for suppressing growing of the mushroom around the discharge outlet of the gas discharge nozzle.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A method for degassing molten metal comprising the steps of:
    establishing a path for circulating molten metal through a degassing chamber maintained under vacuum;
    providing a high pressure has discharge pathway to said circulating path upstream of said degassing chamber for discharging high pressure gas into said molten metal;
    providing a low pressure gas discharge pathway to said circulating path upstream of said degassing chamber for discharging said low pressure gas into said molten metal;
    supplying a high pressure gas to said high pressure gas discharge pathway, the pressure of said high pressure gas adjusted to reach the center portion of said path;
    supplying a low pressure gas to said low pressure gas discharge pathway, the pressure of said low pressure gas adjusted to reach the peripheral portion of said path,
    forming a substantially uniform distribution of gases across said path with said high pressure gas in said center portion of said path and said low pressure gas in said peripheral portion of said path.

2. A method as set forth in claim 1, wherein said high pressure gas and said low pressure gas are discharged transversely relative to the flow direction of said molten metal at the position where said high pressure gas and said low pressure gas are introduced into said molten metal.

3. A method as set forth in claim 1, wherein said degassing chamber is located above the container containing said molten metal, and comprising the further steps of establishing molten metal circulating in separate paths by connecting said degassing chamber with said container by first and second vertical segments, said first vertical segment being arranged upstream of said degassing chamber for introducing molten metal from said container to said degassing chamber and said second segment being arranged downstream of said degassing chamber for recirculating said molten metal from said degassing chamber to said container, and wherein said steps of providing said high and low pressure gases are performed by discharging said high and low pressure gases in substantially horizontal directions.

4. A method as set forth in claim 1, wherein said high and low pressure gases to be discharged into said molten metal are inert gases.

5. A method as set forth in claim 1, wherein said high and low pressure gases comprise mixtures of inert gases and oxygen.

6. A method as set forth in claim 1, wherein the pressure of said high pressure gas is in a range defined by:

$$P = K \times d^{-(i-2)} \times D^{1/j}$$

where
    P is the gas pressure (kg/cm$^2$);
    K is in a range of 0.15 to 0.80
    i is 3.8/d + 2
    j is $\frac{2}{3}$
    d is the discharge nozzle diameter (mm); and
    D is the diameter of the first vertical segment (cm).

7. A method as set forth in claim 1, wherein the pressure of said high pressure gas is in a range of about 30 kg/cm$^2$ to about 50 kg/cm$^2$ and the pressure of said low pressure gas is in a range of the static pressure of the molten metal to 9.9 kg/cm$^2$.

8. A method for degassing molten metal comprising the steps of:
    establishing a path for circulating molten metal through a degassing chamber maintained under a vacuum;
    flowing a high pressure mixture of inert gases and oxygen discharge into said molten metal path upstream of said degassing chamber for discharging said high pressure gas into said molten metal;
    flowing a low pressure mixture of inert gases and oxygen discharge into said molten metal path upstream of said degassing chamber for discharging said low pressure gas into said molten metal; and
    controlling the pressures of said high pressure gas and low pressure gas independently of each other with said high pressure gas being maintained at a higher pressure than said low pressure gas and causing said high pressure gas to extend further into said path than said low pressure gas to form a substantially uniform distribution of said gases across said path.

* * * * *

UNITED STATES PATENT AND TRADEMARK OFFICE
CERTIFICATE OF CORRECTION

PATENT NO. : 5,011,531
DATED : April 30, 1991
INVENTOR(S) : Kiyoshi Takahashi et al It is certified that error appears in the above-identified patent and that said Letters Patent is hereby corrected as shown below: Title page item (54) and;

Column 1, lines 1-3, delete the present title and insert therefor the following:
 --RH METHOD AND APPARATUS FOR DEGASSING MOLTEN METAL--.

Column 1, line 40, after "pipe", first occurrence, insert --to--.

Column 2, line 5, after "to", first occurrence, insert --a value--.

Column 2, line 34, after "and" insert --requires--.

Column 5, line 29, after "intervals" insert --at--.

Column 5, line 35, after "of" insert --the--.

Column 7, line 8, delete "to" and insert therefor --and can--.

Column 7, line 35, delete "the", second occurrence.
 line 9, delete "and can" insert -- to --.

Signed and Sealed this

Twenty-seventh Day of October, 1992

Attest:

DOUGLAS B. COMER

Attesting Officer     Acting Commissioner of Patents and Trademarks